(12) United States Patent
Peruzzo et al.

(10) Patent No.: US 11,760,438 B2
(45) Date of Patent: Sep. 19, 2023

(54) BICYCLE GEARSHIFT

(71) Applicant: CAMPAGNOLO S.r.l., Vicenza (IT)

(72) Inventors: Piero Peruzzo, Vicenza (IT); Cesare Schiavi, Vicenza (IT)

(73) Assignee: CAMPAGNOLO S.R.L., Vicenza (IT)

( * ) Notice: Subject to any disclaimer, the term of this patent is extended or adjusted under 35 U.S.C. 154(b) by 52 days.

(21) Appl. No.: 17/534,927

(22) Filed: Nov. 24, 2021

(65) Prior Publication Data

US 2022/0177076 A1    Jun. 9, 2022

(30) Foreign Application Priority Data

Dec. 3, 2020   (IT) .................... 102020000029612

(51) Int. Cl.
  *B62M 9/1248*   (2010.01)
(52) U.S. Cl.
  CPC ................. *B62M 9/1248* (2013.01)
(58) Field of Classification Search
  CPC ................ B62M 9/1248; B62M 9/124
  USPC ........................................................ 474/80
  See application file for complete search history.

(56) References Cited

U.S. PATENT DOCUMENTS

| 9,290,235 | B2 * | 3/2016 | Yamaguchi | ............ | B62M 9/124 |
| 9,463,846 | B1 * | 10/2016 | Chang | .................. | B62M 9/1248 |
| 9,475,547 | B2 | 10/2016 | Jordan | | |
| 10,577,053 | B2 * | 3/2020 | Brown | .................... | B62M 9/126 |
| 10,759,494 | B2 * | 9/2020 | Shipman | .............. | B62M 9/1248 |
| 2012/0083372 | A1 | 4/2012 | Yamaguchi et al. | | |
| 2013/0203532 | A1 * | 8/2013 | Jordan | ................. | B62M 9/1248 474/82 |
| 2017/0113760 | A1 * | 4/2017 | Lin | ...................... | B62M 9/1248 |
| 2020/0369343 | A1 * | 11/2020 | Chiang | ................. | B62M 9/126 |

FOREIGN PATENT DOCUMENTS

DE    202014106072    2/2015

* cited by examiner

*Primary Examiner* — Gene O Crawford
*Assistant Examiner* — Emily R Kincaid
(74) *Attorney, Agent, or Firm* — Steinfl + Bruno, LLP

(57) ABSTRACT

A bicycle gearshift including a first body associated with a bicycle frame, a second body connected to, and moveable relative to, the first body, a rocker arm rotatably connected to the second body at a rotation axis, and a shaft extending coaxially to this axis and fixedly associated with the rocker arm. A unidirectional rotation device is arranged between the shaft and second body to allow rotation of the shaft relative to the second body only in a first rotation direction. An elastic element is associated with the second body and the rocker arm to push the rocker arm in rotation about the axis in the first rotation direction. A damping device is arranged between the shaft and unidirectional rotation device to generate a friction force when the rocker arm is rotated in a second, opposite rotation direction, and has a friction surface in contact with the unidirectional rotation device.

15 Claims, 11 Drawing Sheets

BICYCLE GEARSHIFT

CROSS REFERENCE TO RELATED APPLICATION

This application claims the benefit of Italian Application No. 102020000029612, filed on Dec. 3, 2020, which is incorporated herein by reference as if fully set forth.

FIELD OF INVENTION

The present invention relates to a bicycle gearshift, preferably to a gearshift for a racing bicycle.

BACKGROUND

In this description, the gearshift to which particular reference is made is the rear one. Such a gearshift moves the chain among the different sprockets of the sprocket assembly associated with the rear wheel of the bicycle.

In addition to the function of correctly moving the chain, the rear gearshift performs the function of keeping the chain correctly tensioned when it is engaged by any of the different sprockets and during the gearshifting, so as to prevent the chain from dropping.

The rear gearshift typically comprises a first body associated with the frame of the bicycle and a second body that supports a rocker arm. The latter comprises an inner plate, an outer plate and a pair of toothed wheels arranged between the inner and outer plates and configured to engage the chain.

Throughout this description, the terms "inner plate" and "outer plate" refer to the plate of the rocker arm that, when the rocker arm is mounted on the bicycle, faces the wheel of the bicycle and the plate of the rocker arm that, in the aforementioned mounting condition, is arranged in a more external position with respect to the wheel of the bicycle, respectively.

The second body is connected to the first body through a pair of articulated connection rods so as to form an articulated quadrilateral actuation linkage. Such a linkage is actuated mechanically by a sheathed cable or electrically by an electric motor.

Upon actuating the aforementioned linkage, the second body is moved with respect to the first body so as to move the rocker arm at the sprocket selected by the cyclist and engage the chain on such a sprocket.

The rocker arm is rotatably connected to the second body at a predetermined rotation axis.

Throughout the present description and in the claims, the terms "axial" or "axially" are used to indicate a direction coinciding with or parallel to the aforementioned rotation axis, the terms "circumferential" or "circumferentially" are used to indicate a direction that rotates about the aforementioned rotation axis, whereas the terms "radial" or "radially" are used to indicate a direction passing through and perpendicular to the aforementioned rotation axis.

An elastic element, typically a torsion spring, pushes the rocker arm into rotation about such a rotation axis in a direction of rotation that will be indicated hereinafter as "chain tensioning direction". When observing the outer plate of the rocker arm mounted on the bicycle from the front, the chain tensioning direction corresponds to a direction of rotation in the clockwise direction of the rocker arm about the aforementioned rotation axis.

During the gearshifting operations and/or during travel, especially in the case of an irregular road surface, the rocker arm is subject to oscillations about the aforementioned rotation axis. During such oscillations, the rocker arm moves in a direction of rotation opposite to the chain tensioning direction, causing a momentary detensioning of the chain and a consequent risk of chain dropping.

In order to damp the oscillations of the rocker arm it is known to provide a unidirectional damping device between the rocker arm and the second body. Such a damping device is configured so as to apply a friction force to the rocker arm when the rocker arm is moved about the rotation axis in the direction of rotation opposite to the chain tensioning direction and to allow the rocker arm to be free to rotate in the chain tensioning direction.

U.S. Pat. No. 9,475,547 describes, with reference to FIG. 7 thereof, an embodiment of a bicycle rear gearshift comprising a unidirectional rotation device consisting of a unidirectional roller bearing 246 and a damping device 238 comprising a friction element 250 having an annular shape and operatively arranged between a shaft 240 fixedly connected to the rocker arm and the unidirectional roller bearing 246. The friction element 250 comprises a frusto-conical or wedge-shaped friction surface that interacts with a sleeve 248 fixedly connected to the inner ring of the unidirectional roller bearing 246. An adjustment element 277 acts on the friction element 250, said element 277 being screwed onto the shaft 240 and exerting an axial preload force on the friction element 250.

The Applicant has observed that, due to the frusto-conical or wedge-shaped friction surface thereof, the friction element 250 exerts on the sleeve 248 a thrust having both a radial component and an axial component.

The Applicant has identified a series of drawbacks in the aforementioned bicycle gearshift.

Firstly, due to the aforementioned axial component, only part of the axial preload force exerted by the adjustment element 277 on the friction element 250 is converted into a radial thrust on the inner ring of the unidirectional roller bearing 246. Moreover, since the aforementioned radial thrust is generated only by the axial preload force generated by the adjustment element 277, it is necessary to act on such an adjustment element 277 in order to compensate a possible reduction in the amount of the radial thrust due to the wearing of the components or to the dimensional tolerances of the components. Furthermore, it is necessary to obstruct the axial movement of the sleeve 248 in order to have a sufficient radial thrust on the inner ring of the unidirectional roller bearing 246. Finally, it is difficult to prevent a part of the friction force from also acting on the interface between the shaft 240 and the element 250, and this makes the performance of the system inefficient and not constant.

Applicant has observed that the aforementioned drawbacks, if not properly considered, can cause the gearshift not to have an optimal operating efficiency and constancy of performance over time in response to stresses that tend to move the rocker arm in the direction of rotation opposite to the chain tensioning direction.

SUMMARY

The problem at the basis of the present invention is that of making a bicycle gearshift that comprises a damping device that ensures a greater efficiency and constancy of performance over time with respect to the prior art.

The provision of a friction surface extending axially along a direction substantially parallel to the rotation axis of the rocker arm causes a friction force having only a circumferential component to be generated between the damping device and the unidirectional rotation device and the damping device to exert on the unidirectional rotation device a thrust having only a radial component, that is without undesired axial components.

The operating efficiency of the gearshift is thus improved since, once a certain radial preload has been applied to the unidirectional rotation device through the damping device, the entire preload force is converted into a radial thrust on the unidirectional rotation device.

During the useful life of the gearshift, possible dimensional divergences with respect to the design dimensions due to the wearing of the components of the gearshift or to the dimensional tolerances thereof can be compensated automatically by the damping device, which adjusts itself by suitably changing the radial thrust exerted on the unidirectional rotation device. There is thus an advantageous constancy of performance of the gearshift over time. Consequently, it is easier to provide and precisely control the behavior of the gearshift in response to the stresses that would tend to move the rocker arm in the direction of rotation opposite to the chain tensioning direction.

BRIEF DESCRIPTION OF THE DRAWINGS

Further features and advantages of the present invention will become clearer from the following detailed description of preferred embodiments thereof, made with reference to the attached drawings and given only for indicating and not limiting purposes. In such drawings.

DETAILED DESCRIPTION

Figure 1:
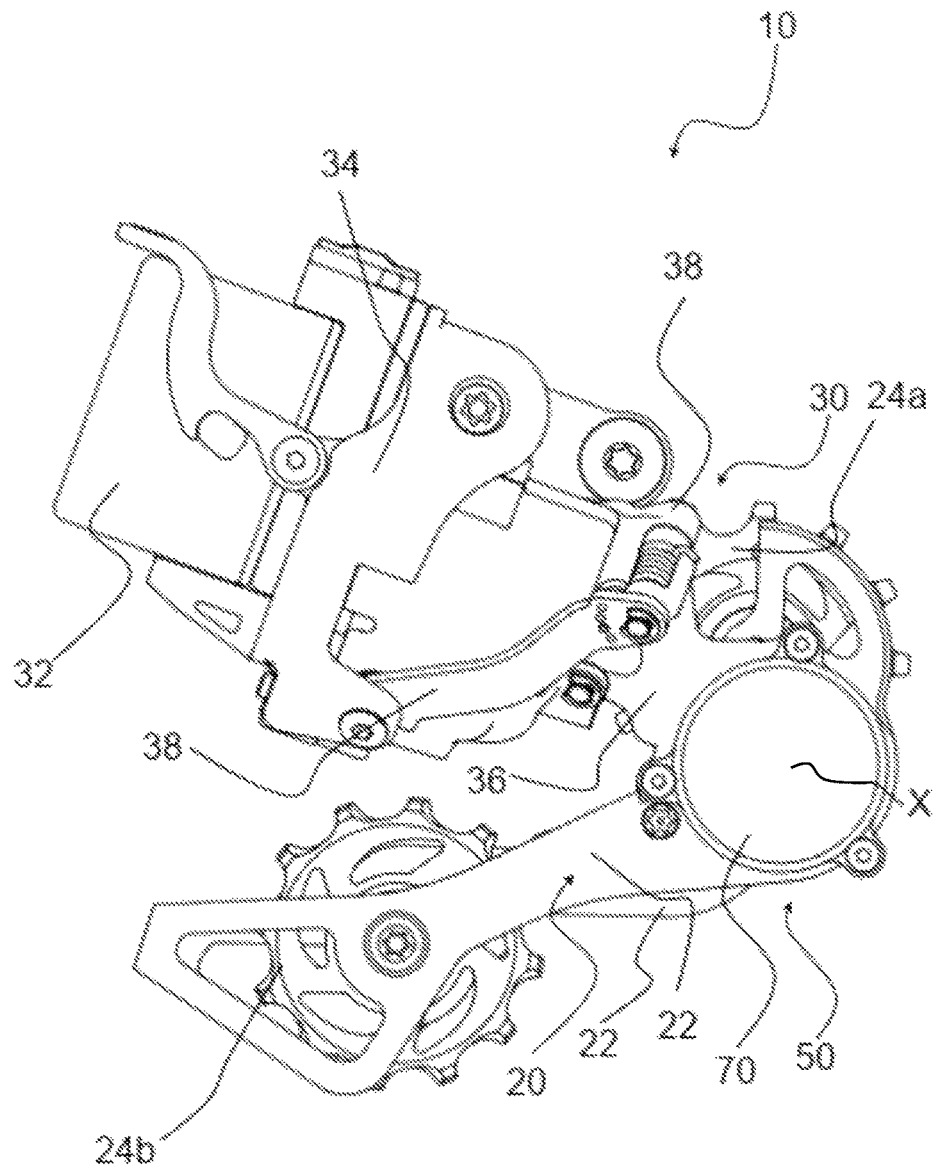
FIG. 1 is a perspective view of a first preferred embodiment of a bicycle gearshift in accordance with the present invention.

The present invention therefore relates to a bicycle gearshift, comprising:
a first body configured to be associated with a bicycle frame;
a second body connected to, and moveable with respect to, said first body;
a rocker arm rotatably connected to said second body at a rotation axis;
a shaft extending coaxially to said rotation axis and fixedly associated with said rocker arm;
a unidirectional rotation device operatively arranged between said shaft and said second body and configured to allow the rotation of said shaft with respect to the second body only in a first direction of rotation about said rotation axis;
a first elastic element associated with the second body and with the rocker arm and configured to push said rocker arm in rotation about said rotation axis in said first direction of rotation;
a damping device operatively arranged between said shaft and said unidirectional rotation device and configured to generate a friction force when said rocker arm is moved about said rotation axis in a second direction of rotation opposite to said first direction of rotation;
characterized in that said damping device comprises at least one friction surface extending axially along a direction substantially parallel to the rotation axis and in contact with said unidirectional rotation device.

Hereinafter, preferred and/or optional features of the bicycle gearshift according to the present invention are described. Such features can be provided individually or in combination with one another, unless explicitly stated otherwise.

Preferably, the damping device comprises at least two friction surfaces. For example, there can be two, three or four friction surfaces.

In the case of two friction surfaces, they are preferably arranged on opposite sides with respect to the rotation axis, i.e. about 180° from one another.

In the case of three surfaces, they are preferably arranged about 120° from one another.

In the case of four friction surfaces, they are preferably arranged about 90° from one another.

In all of the above cases, the damping device acts on the unidirectional rotation device in a balanced manner about the rotation axis.

Preferably, the aforementioned friction surfaces are defined on respective jaws.

Preferably, each of said at least two friction surfaces extends circumferentially about said rotation axis for an arc of circumference having a center on said rotation axis and a center angle lower than 180°.

Preferably, said center angle is comprised between 80° and 160°, more preferably between 110° and 140°, even more preferably it is equal to about 125°.

Preferably, the damping device comprises at least one thrusting member configured to thrust said at least one friction surface against said unidirectional rotation device with a predetermined load.

Such a thrusting member determines a preload force that, in turn, determines the value of the radial thrust exerted by the damping device on the unidirectional rotation device, and thus the extent of the damping action.

Moreover, the thrusting member makes it possible to recover possible dimensional divergences from the design dimensions caused by wearing or dimensional tolerances, contributing to actuate the abovementioned automatic compensation.

The provision of the aforementioned thrusting member allows to define the desired thrusting force in the assembly step of the gearshift, making it superfluous and/or needless any post-sale maintenance intervention aimed at adjusting the thrusting force exerted by the damping device on the unidirectional rotation device. Such an intervention would indeed by onerous since it would require the complete dismounting of the rocker arm, of the first elastic element and of the damping device.

In a first embodiment of the invention, and in the case in which such a gearshift comprises two friction surfaces arranged on opposite sides with respect to the rotation axis, said at least one thrusting member comprises a second elastic element housed in a through hole formed in said shaft along a direction perpendicular to said rotation axis.

Preferably, said second elastic element is arranged in a radially inner position with respect to the two friction surfaces.

The second elastic element crosses the shaft and pushes, at the two end portions thereof, the two opposite friction surfaces against the unidirectional rotation device with the same force. Therefore, the radial thrust that is exerted on a friction surface is counteracted by the opposite friction surface through the second elastic element.

Preferably, the second elastic element is a helical spring.

In this case, therefore, the radial thrust is solely a function of the elastic constant of the helical spring. In the assembly step of the gearshift, it will be possible to select, among various possibly available springs, the one having an elastic constant suitable for applying the desired radial thrust on the unidirectional rotation device.

Preferably, the two friction surfaces are formed on respective jaws provided with respective seats configured to house a respective end portion of the second elastic element.

Such seats contribute to prevent undesired axial movements of the second elastic element, ensuring that the entire preload force applied by the thrusting member is converted into a radial thrust.

In a second embodiment of the invention, and independently from the number of friction surfaces provided, said at least one thrusting member comprises at least one cup spring or at least one helical spring arranged between said shaft and said at least one friction surface.

Also in this case the radial thrust is only a function of the elastic constant of the spring(s). In this case, however, the radial thrust that is exerted on a friction surface is counteracted by the shaft.

In the assembly step of the gearshift, also in this case it will be possible to select, among various possibly available springs, the one(s) having an elastic constant suitable for applying the desired radial thrust on the unidirectional rotation device.

In some embodiments of the gearshift of the present invention, the damping device comprises an adjustment device configured to adjust said predetermined load.

In a first embodiment thereof, said adjustment device comprises at least one first spacer element having a predetermined thickness.

Such an adjustment device can be arranged between said at least one thrusting member and said at least one friction surface or between said at least one thrusting member and said shaft or both between said at least one thrusting member and said at least one friction surface and between said at least one thrusting member and said shaft.

The first spacer element can, for example, be a washer having a calibrated thickness. In the assembly step of the gearshift, it will be possible to select, among possibly available spacer elements having different thicknesses, the one having a thickness suitable for applying the desired radial thrust on the unidirectional rotation device.

In another embodiment thereof, said adjustment device comprises a preload device comprising a thrusting pin moveable in a first hole extending in said shaft along a first direction perpendicular to the rotation axis and exerting a thrust on at least one thrust plate moveable in a second hole connected to said first hole and extending in said shaft along a second direction perpendicular to the rotation axis.

Preferably, the second hole is arranged in a radially inner position with respect to said at least one thrusting member.

The preload device makes it possible to adjust the preload force applied by the damping device on the unidirectional rotation device as desired.

Preferably, the first hole and the second hole are substantially perpendicular.

More preferably, said thrusting pin comprises a substantially wedge-shaped end portion.

Even more preferably, said at least one thrust plate comprises a substantially wedge-shaped end portion in abutment with the substantially wedge-shaped end portion of said thrusting pin.

Preferably, the aforementioned wedge-shaped surfaces are inclined by about 45° with respect to the rotation axis, but they can also be inclined by different angles, comprised between 15° and 75°. In this way, the movement of the pin along the axis thereof is converted into a radial movement of the thrust plate, and the choice of the angle of inclination provides a greater or lower adjustment sensitivity.

Preferably, the axis of the pin is substantially perpendicular to the rotation axis.

In a further embodiment thereof, said adjustment device comprises a second spacer element having a predetermined thickness, the second spacer element being housed in a through hole formed in said shaft along a direction perpendicular to said rotation axis and arranged in a radially inner position with respect to said at least two friction surfaces.

Preferably, said at least one thrusting member comprises a plurality of cup springs housed inside a bushing which is housed in said through hole and which is arranged on opposite sides with respect to said second spacer element.

In this case, the radial thrust that is exerted on a friction surface is counteracted by the opposite friction surface through the second spacer element and the cup springs. The radial thrust exerted by the damping device on the unidirectional rotation device is therefore a function of both the elastic constant of the cup springs and the thickness of the second spacer element. In the assembly step of the gearshift it is thus necessary to suitably select, among various springs and various spacer elements, those having an elastic constant and a thickness, respectively, suitable for applying the desired radial thrust on the unidirectional rotation device.

In a preferred embodiment of the invention, said shaft comprises, in a radially inner position with respect to said damping device, an enlarged portion.

Preferably, said enlarged portion comprises at least one flat surface.

Preferably, said enlarged portion comprises a flat surface facing a respective friction surface.

Preferably, said adjustment device is arranged at said enlarged portion. The through hole configured to house the helical springs and/or the cup springs and/or the second spacer element discussed above is therefore formed on said enlarged portion and opens out onto two opposite flat surfaces of such an enlarged portion.

In the cases in which the enlarged portion of the shaft does not have the aforementioned through hole, the flat portion defines an abutment surface for the end portion of the thrusting member opposite the one which exerts the thrust on the friction surface.

In a preferred embodiment of the invention, the unidirectional rotation device comprises a radial bearing having an outer ring fixedly associated with said second body and an inner ring operatively associated with said at least one friction surface.

Preferably, the radial bearing is a roller bearing, so as to contain the radial dimensions of the bearing.

In a first preferred embodiment of the invention, the damping device is at least partially arranged in a radially inner position with respect to said inner ring. The gearshift, in this case, has a small axial dimension.

Preferably, the damping device is entirely arranged in a radially inner position with respect to said inner ring.

In a second preferred embodiment of the invention, the damping device is at least partially arranged in a radially inner position with respect to an annular element fixedly associated with, and axially adjacent to, said inner ring.

Preferably, in this case the gearshift comprises a self-lubricating bushing arranged between said shaft and said inner ring.

Such a bushing ensures the precise centering of the shaft with respect to the unidirectional rotation device, and thus with respect to the damping device, without generating undesired additional friction (i.e. further friction with respect to the friction force generated by the friction surface) between the damping device and the radial bearing.

Preferably, the annular element has a diameter greater than that of the inner ring of the radial bearing.

Preferably, the annular element is axially arranged between the inner ring of the radial bearing and the rocker arm.

In a preferred embodiment thereof, the gearshift of the invention comprises a pair of axial abutment surfaces arranged on opposite sides with respect to said damping device and configured to prevent an axial movement of said damping device, in particular of the friction surfaces.

Preferably, a first surface of said axial abutment surfaces is made in a single piece with the shaft.

Preferably, the first axial abutment surface is axially adjacent to the enlarged portion of the shaft, more preferably it is arranged between the enlarged portion of the shaft and the rocker arm.

In some embodiments, the first axial abutment surface is formed substantially at the middle of the shaft.

The other of the aforementioned axial abutment surfaces can be defined by the interface surface between the inner ring of the radial bearing and the aforementioned annular element, when provided, or by a flange associated with an end portion of the shaft opposite the one associated with the rocker arm, when the aforementioned annular element is not provided and the damping device is housed inside the inner ring of the radial bearing.

Preferably, said first elastic element comprises a helical return spring.

The damping device can be arranged at least partially in a radially inner position with respect to said return spring. Such a provision makes it possible to keep the axial dimensions of the gearshift low.

Preferably, the damping device is entirely arranged in a radially inner position with respect to said return spring.

The damping device can also be arranged at least partially in an axially adjacent position with respect to said return spring. This is the case for example when the damping device is arranged at least partially in a radially inner position with respect to the inner ring of the radial bearing, which is arranged at least partially in an axially adjacent position to the return spring.

Figure 2:
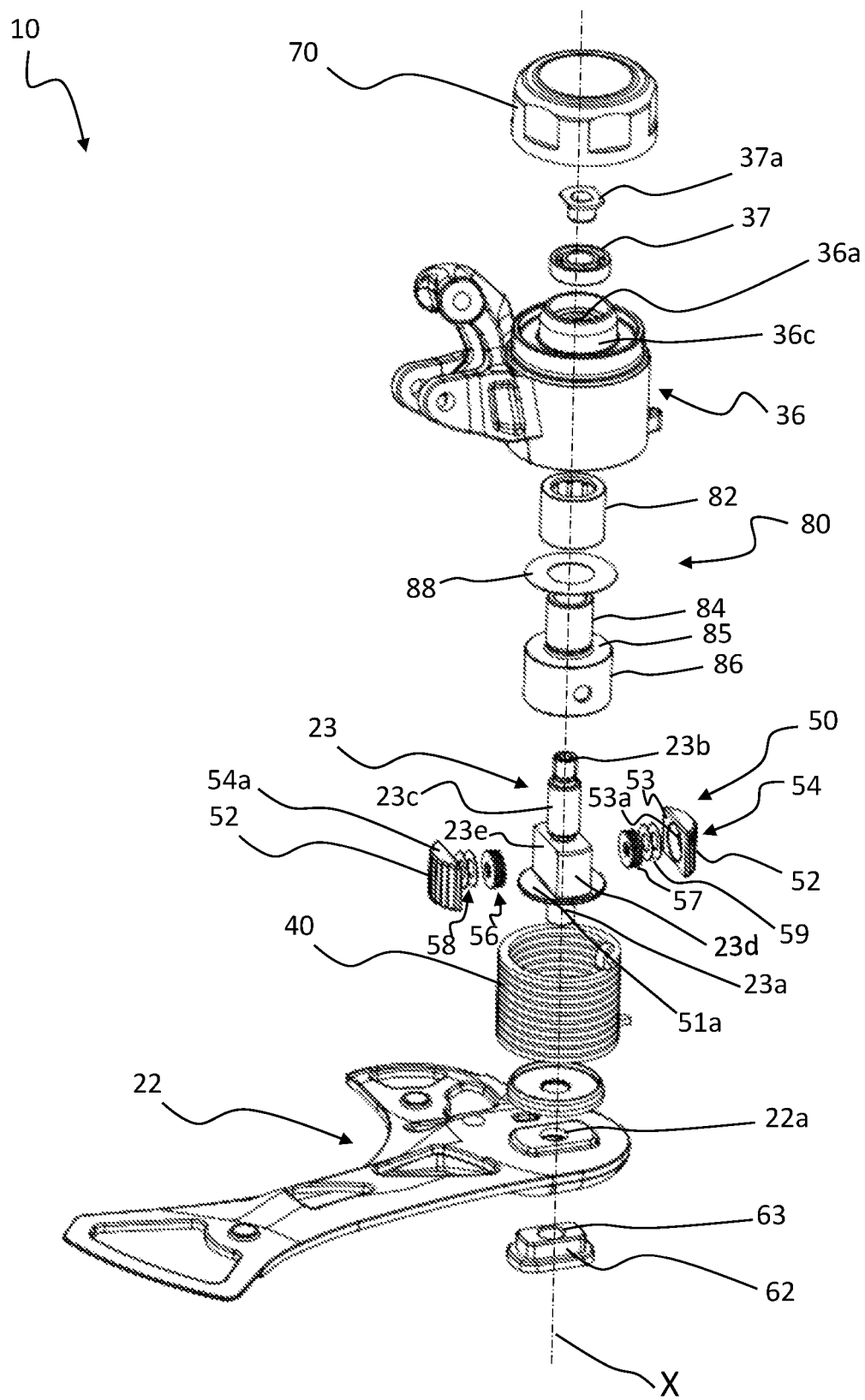
FIG. 2 is an exploded perspective view of a portion of the bicycle gearshift of FIG. 1.
Figure 3:
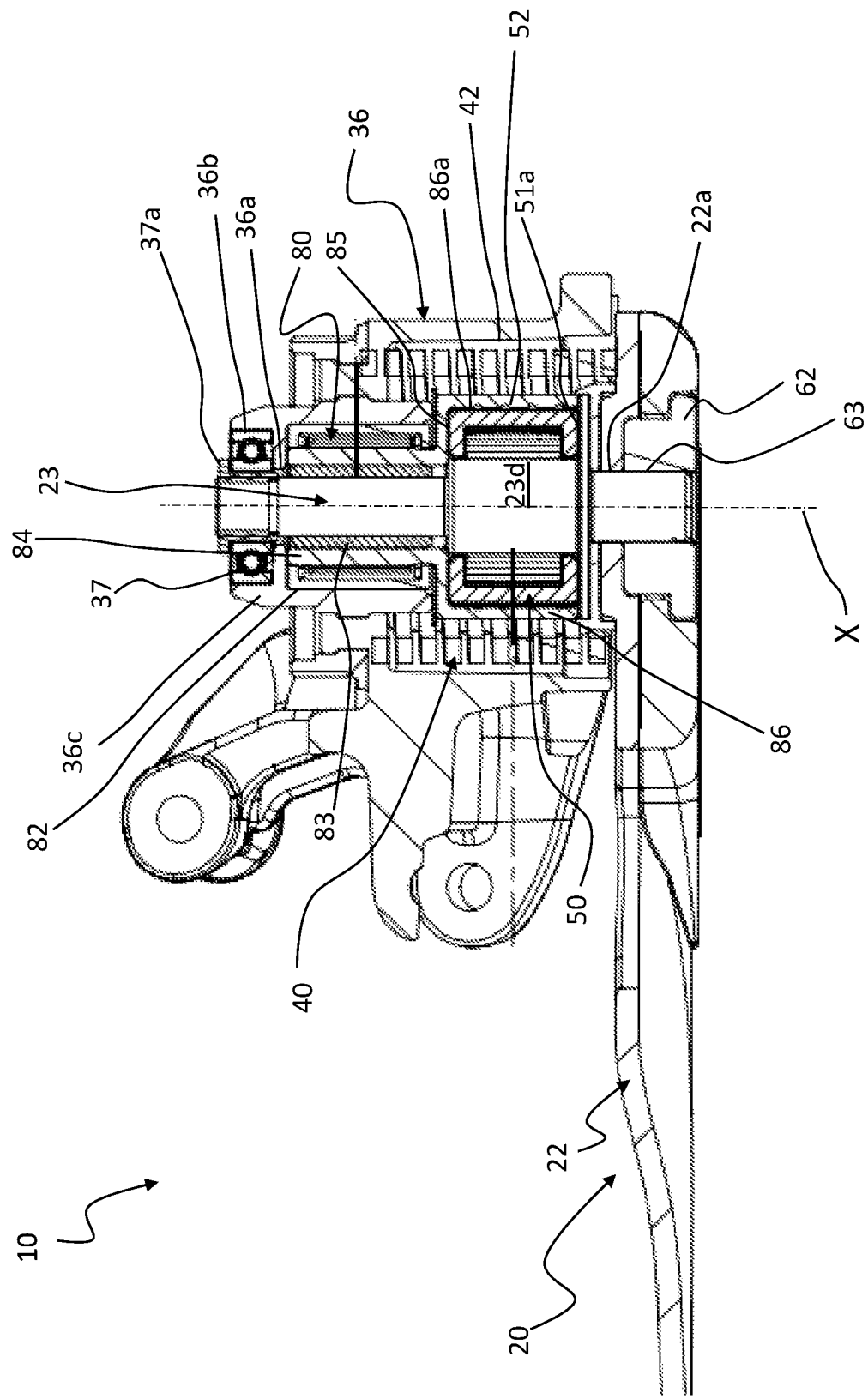
FIG. 3 is a longitudinal section view of the portion of the bicycle gearshift of FIG. 2.

Referring now to the figures, in FIGS. 1-3, reference numeral 10 indicates a bicycle gearshift according to a first preferred embodiment of the present invention.

In particular, it is a rear gearshift, i.e. a gearshift configured to be mounted on a bicycle frame (not shown) to move the chain (not shown) among the different sprockets (not shown) of the sprocket assembly associated with the rear wheel of the bicycle.

The movement of the chain is actuated through the movement of a rocker arm 20. Such a movement is a consequence of the movement of an actuation linkage 30.

The gearshift 10 can be mechanically actuated (through a sheathed cable) or motorized (through an electric motor). The attached figures show, as a non-limiting example, a motorized gearshift, wherein the movement of the rocker arm 20 takes place by means of a motor member 32 that is suitably driven, typically electrically. Once the motor member 32 is driven, the actuation linkage 30 deforms and the rocker arm 20 moves.

The actuation linkage 30 is an articulated quadrilateral linkage, preferably an articulated parallelogram linkage. It comprises a first body 34 configured to be associated with the frame of the bicycle, a second body 36 configured to support the rocker arm 20 and a pair of articulated connection rods 38 that connect the first body 34 and the second body 36. The connection rods 38 are also respectively called "inner connection rod" and "outer connection rod", with reference to their relative position with respect to the frame of the bicycle.

The rocker arm 20 is associated with the second body 36.

In the example illustrated herein, the motor member 32 is housed in the first body 34 and drives the deformation of the actuation linkage 30, lengthening or shortening a diagonal of the articulated quadrilateral. In particular, a lengthening of such a diagonal is used to carry out an upward gearshifting (towards a sprocket having a greater diameter), whereas a shortening of the diagonal is used for a downward gearshifting (towards a sprocket having a smaller diameter).

Upon deformation of the actuation linkage 30, the second body 36 is moved with respect to the first body 34, the rocker arm 20 moves to the sprocket selected by the cyclist and the chain is engaged by such a sprocket.

The rocker arm 20 comprises a pair of opposite plates 22, an inner one and an outer one, and a pair of toothed wheels 24a, 24b arranged between the inner and outer plates 22 and configured to engage the chain. The outer plate 22 is adjacent to the second body 36.

The rocker arm 20 is rotatably connected to the second body 36 at a predetermined rotation axis X substantially perpendicular with respect to the planar extension of the outer plate 22.

A shaft 23 is fixedly associated with the outer plate 22 of the rocker arm 20. Such a shaft 23 extends coaxially to the rotation axis X through the second body 36 and is configured to rotate as a unit with the rocker arm 20 with respect to the second body 36 about the rotation axis X.

As shown in FIGS. 2 and 3, a fixing element 62 is coupled with the outer plate 22 of the rocker arm 20. The fixing element 62 can be co-molded, glued, embedded with interference or joined in other per se conventional ways to the outer plate 22.

The fixing element 62 has a hole 63 extending coaxially to the rotation axis X.

An end portion 23a of the shaft 23 passes through a through hole 22a formed in the outer plate 22 and is housed in the hole 63 of the fixing element 62, for example through an interference or threaded coupling.

An opposite end portion 23b of the shaft 23 passes through a through hole 36a formed in the second body 36 and couples with a ring nut 37a. In the non-limiting example shown in FIGS. 1-3, the through hole 36a is formed in an insert 36c co-molded with the second body 36.

A support bearing 37 is arranged between the end portion 23b and a corresponding end portion of the second body 36. Such a support bearing 37 is housed in a seat 36b of the second body 36 coaxial to the rotation axis X. In the non-limiting example shown in FIGS. 1-3, the seat 36b is formed in an end portion of the insert 36c.

The ring nut 37a prevents the support bearing 37 from coming out of the seat 36b and axially locks the shaft 23. The ring nut could be replaced by a Seeger ring.

The gearshift 10 also comprises a cover 70 removably associated with the second body 36 through a snap coupling, or a threaded coupling, or an interference coupling, or through screws, gluing or other per se conventional ways. The cover 70 is arranged above the end portion 23b of the shaft 23, thereby also covering the support bearing 37.

An elastic element, which in the embodiment shown in FIGS. 1-3 is a helical return spring 40, is associated with the second body 36 and with the rocker arm 20 so as to push the rocker arm 20 in rotation about the rotation axis X in a chain tensioning direction. In FIG. 1, which corresponds to a substantially frontal view of the outer plate 22 of the rocker arm 20 mounted on the bicycle, the chain tensioning direction corresponds to a direction of rotation of the rocker arm 20 in the clockwise direction.

As shown in FIG. 3, a helical return spring 40 is housed in a seat 42 formed in the second body 36.

An unidirectional rotation device 80 is operatively arranged between the shaft 23 and the second body 36. Such a unidirectional rotation device 80 is configured to allow the rotation of the shaft 23 with respect to the second body 36 only in the chain tensioning direction.

In particular, the unidirectional rotation device 80 comprises a radial bearing having an outer ring 82 fixedly associated with the second body 36 and an inner ring 84. In the non-limiting example shown in FIGS. 1-3, the outer ring 82 is fixedly associated with the insert 36c.

The radial bearing is preferably a roller bearing.

A damping device 50 is operatively arranged between the shaft 23 and the unidirectional rotation device 80. Such a damping device 50 is configured to apply a friction force to the rocker arm 20 when the rocker arm 20 is moved about the rotation axis X in a direction of rotation opposite to the chain tensioning direction, i.e.—with reference to FIG. 1—in the counter-clockwise direction of rotation.

As shown in FIG. 2, the damping device 50 comprises two friction surfaces 52 that extend axially along a direction substantially parallel to the rotation axis X.

The two friction surfaces 52 are arranged on opposite sides with respect to the rotation axis X, i.e. about 180° from one another.

Each friction surface 52 is defined on a jaw 54.

In the example illustrated herein the jaw 54 has the shape of a cylindrical cap, with a cylindrical surface that defines the friction surface 52 and a flat base surface 53. In particular, the jaw 54, in any cross section thereof (i.e. in sections taken according to a plane perpendicular to the rotation axis X), is shaped like a circular segment defined by an arc of circumference and by the cord of this circumference. The friction surface 52 is defined at the aforementioned arc of circumference, whereas the flat surface 53 is defined at the aforementioned cord of circumference.

The friction surface 52 extends circumferentially about the rotation axis X for an arc of circumference having a center on the rotation axis X and a center angle lower than 180°, preferably comprised between 80° and 160°, more preferably between 110° and 140°, even more preferably equal to about 125°.

The friction surface 52 acts directly or indirectly on the inner ring 84 of the radial bearing to obstruct the rotation of the latter.

The friction surface 52 is preferably provided with knurlings and/or ribs, to convey the possible lubricant used for the internal members and prevent such lubricant from going on the outermost part of the surface 52, which on the other hand must generate friction.

In the example shown in FIGS. 1-3, the inner ring 84 of the radial bearing is operatively associated with the friction surface 52 through an annular element 86 fixedly associated with the inner ring 84. The annular element 86 therefore forms part of the unidirectional rotation device 80.

The annular element 86 is axially adjacent to the inner ring 84. In particular, it is axially arranged between the inner ring 84 of the radial bearing and the rocker arm 20.

The annular element 86 has a diameter greater than that of the inner ring 84. The latter is thus connected to the annular element 86 through a flat annular interface surface 85 that extends perpendicular to the rotation axis X. As described hereinafter, such an annular interface surface 85 defines an axial abutment surface for the jaws 54.

A washer 88 is arranged between the annular interface surface 85 and the outer ring 82 of the radial bearing, and acts as a spacer.

In this embodiment of the gearshift 10 of the invention, the damping device 50 is arranged in a radially inner position with respect to the annular element 86.

The shaft 23 comprises a cylindrical portion 23c adjacent to the end portion 23b and arranged in a radially inner position with respect to the inner ring 84, and an enlarged portion 23d adjacent to the end portion 23a and arranged in a radially inner position with respect to the annular element 86.

A self-lubricating bushing 83 is preferably arranged between the cylindrical portion 23c of the shaft 23 and the inner ring 84. Such a self-lubricating bushing 83 supports the shaft 23, ensuring a predetermined radial clearance with respect to the inner ring 84. Such a radial clearance is suitable for avoiding the seizure of the shaft 23, which is subjected to a torsional-flexional load by the rocker arm 20.

Indeed, the self-lubricating bushing 83 performs the same function performed by the support bearing 37. Therefore, there are embodiments in which only the self-lubricating bushing 83 is provided and not also the support bearing 37, embodiments in which only the support bearing 37 is provided and not also the self-lubricating bushing 83, and embodiments (like the one shown in FIGS. 1-3) in which both the self-lubricating bushing 83 and the support bearing 37 are provided.

The enlarged portion 23d comprises two opposite flat surfaces 23e, each of them facing a respective jaw 54.

The damping device 50 comprises a thrusting member 56 arranged between the shaft 23 and a respective jaw 54 and configured to push the jaw 54 against a radially inner cylindrical surface 86a of the annular element 86 with a predetermined load (preload).

The thrusting member 56 comprises cup springs or helical springs. In the non-limiting example shown in FIG. 2, a plurality of cup springs 57 is provided at each jaw 54.

In the non-limiting example shown in FIGS. 1-3, the damping device 50 also comprises an adjustment device 58 configured to adjust the aforementioned predetermined load. In a variant that is not shown, the adjustment device 58 can be omitted.

The adjustment device 58 comprises spacer elements 59 having a predetermined thickness, for example washers having a calibrated thickness. In particular, in the non-limiting example shown in FIGS. 1-3, two washers are provided at each thrusting member 56.

Each of the two opposite flat surfaces 23e of the enlarged portion 23d defines an abutment surface for an end portion of the thrusting member 56 opposite the one which exerts the thrust on the jaw 54.

In the non-limiting example shown in FIG. 2, the two washers are arranged between the thrusting member 56 and the jaw 54, in particular between the plurality of cup springs 57 and the flat surface 53 of the jaw 54. Such washers can also or only be arranged between the flat surface 23e of the shaft 23 and the end portion of the thrusting member 56 adjacent thereto.

A substantially cylindrical seat 53a is formed on the flat surface 53 of each jaw 54, said seat being configured to house the washers and, preferably, at least part of the cup springs 57, so as to prevent undesired axial movements of the latter.

An axial abutment surface 51a is made in a single piece with the shaft 23 in a position axially adjacent to the enlarged portion 23d and arranged between the enlarged portion 23d and the rocker arm 20. As shown in FIGS. 2 and 3, the axial abutment surface 51a is arranged between the enlarged portion 23d and the end portion 23a of the shaft 23 and cooperates with the annular interface surface 85 to hold the jaws 54 in a predetermined axial position.

The jaws 54 have two opposite axial abutment surfaces 54a configured to be axially contained by the axial abutment surfaces 51a, 85, with a suitable clearance that prevents the sliding thereof.

In the non-limiting example shown in FIGS. 1-3, the damping device 50, as well as the annular element 86, is entirely arranged in a radially inner position with respect to the helical return spring 40.

Figure 4:
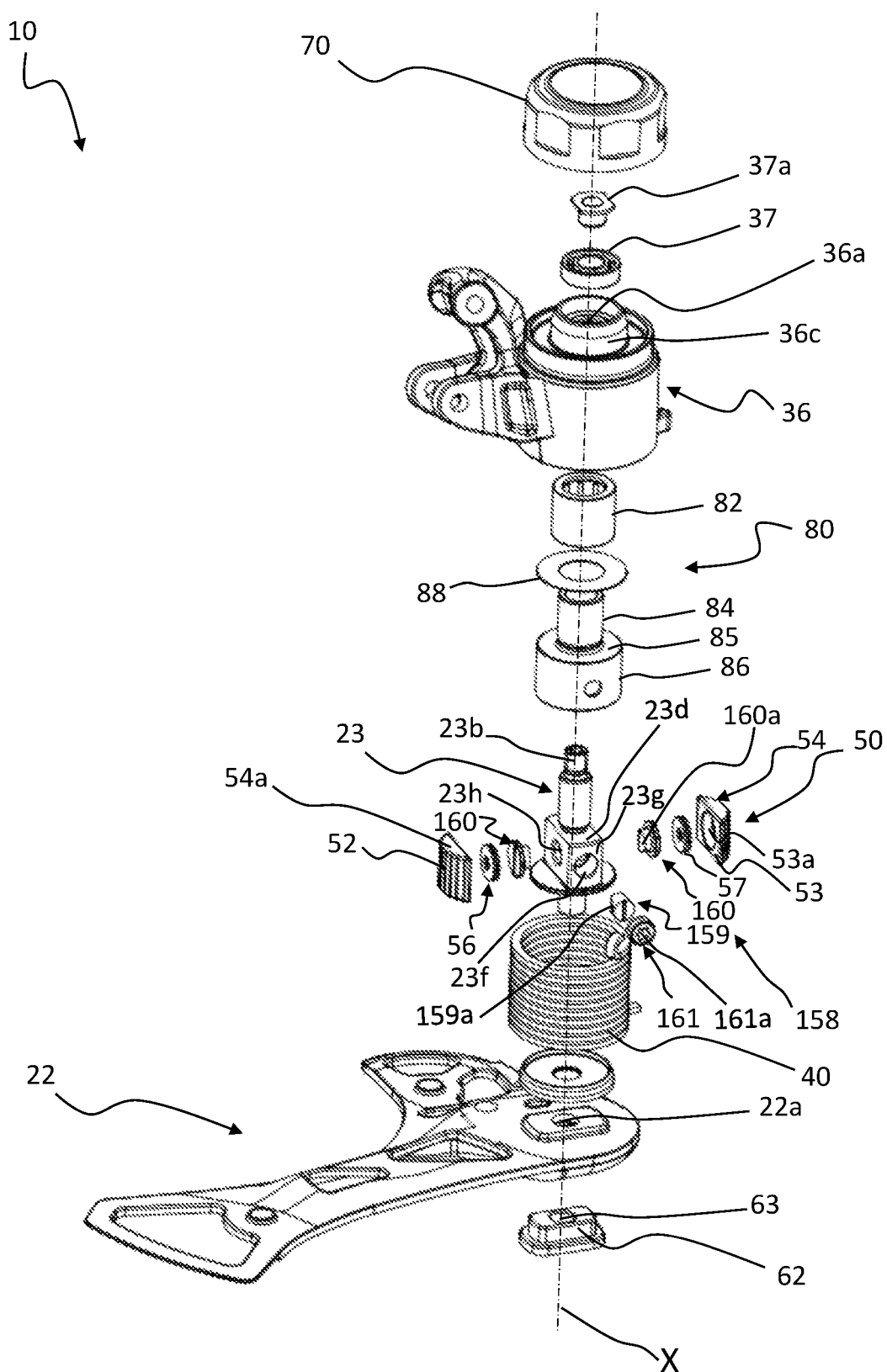
FIG. 4 is an exploded perspective view of a portion of a second preferred embodiment of a bicycle gearshift in accordance with the present invention.
Figure 5:
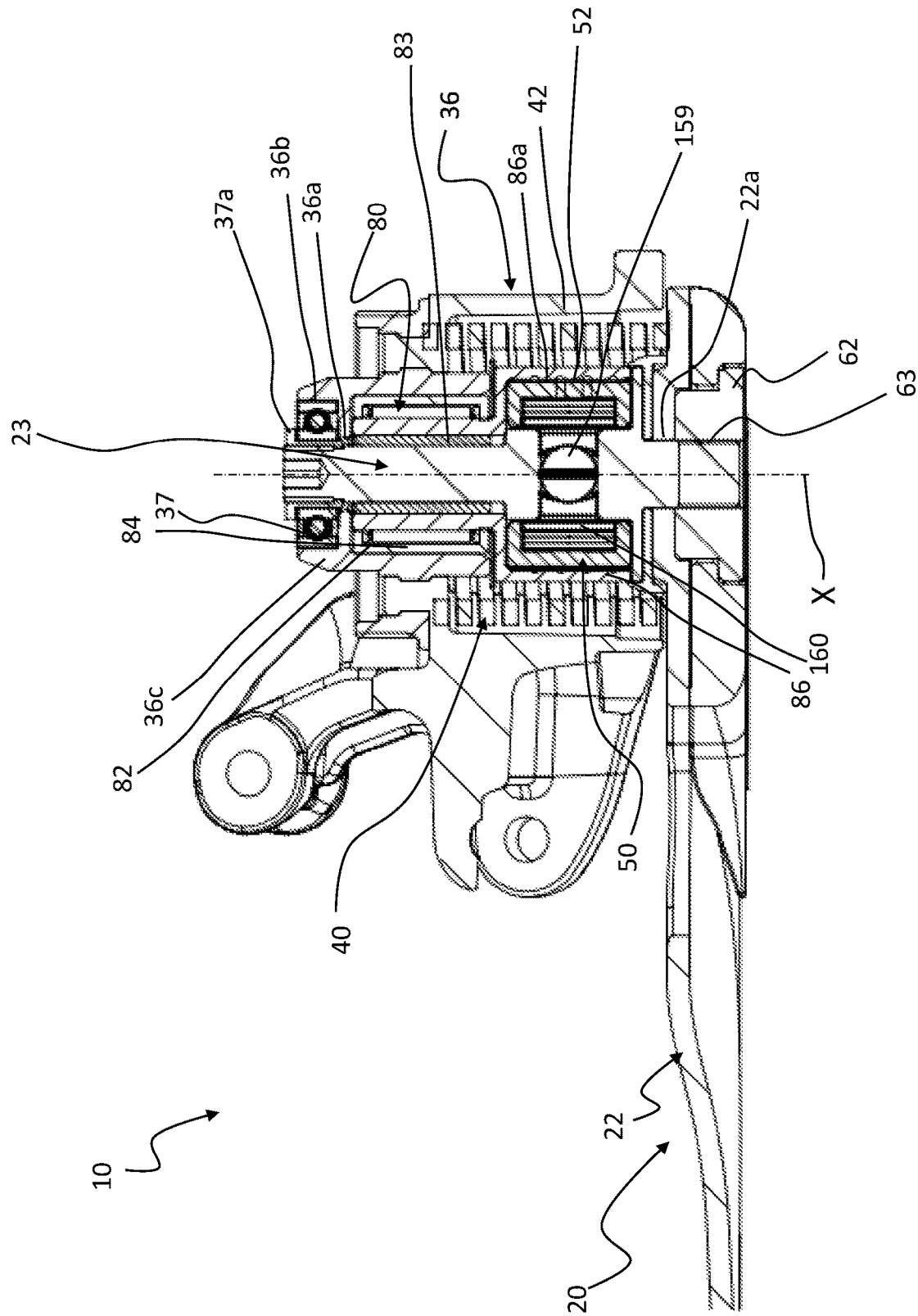
FIG. 5 is a longitudinal section view of the portion of the bicycle gearshift of FIG. 4.

FIGS. 4 and 5 show a second preferred embodiment of a bicycle gearshift 10 according to the present invention.

The components of the bicycle gearshift 10 of FIGS. 4 and 5 analogous or functionally equivalent to those of the bicycle gearshift 10 of FIGS. 1-3 are indicated with the same reference numeral and for their description reference should be made to what has been described above.

The bicycle gearshift 10 of FIGS. 4 and 5 differs from the bicycle gearshift 10 of FIGS. 1-3 substantially in that the adjustment device 58 comprises a preload device 158 comprising a thrusting pin 159 and a pair of opposite thrust plates 160. The washers shown in FIG. 2 are not provided here, but embodiments analogous to that of FIGS. 4 and 5 are foreseen in which washers analogous to those shown in FIG. 2 are provided.

The thrusting pin 159 is moveable inside a hole 23f extending in the shaft 23 at the enlarged portion 23d thereof.

The hole 23f extends along a direction perpendicular to the rotation axis X and opens out onto a surface 23g of the enlarged portion 23d that connects the two opposite flat surfaces 23e.

Each thrust plate 160 is moveable inside a respective hole 23h which extends in the shaft 23 at the enlarged portion 23d thereof.

Each hole 23h extends along a direction perpendicular to the rotation axis X and opens out onto one of the two opposite flat surfaces 23e.

Each hole 23h is connected to the hole 23f.

The two holes 23h are substantially aligned and can be connected together, to define a single through hole 23h.

The thrusting pin 159, when pushed inside the hole 23f and brought into contact with the two thrusting plates 160, causes the movement of the latter in the respective holes 23h.

The first hole 23f and each second hole 23h are substantially perpendicular to one another.

The thrusting pin 159 and each thrust plate 160 comprise respective substantially wedge-shaped end portions 159a, 160a configured to abut against one another. Preferably, the aforementioned substantially wedge-shaped surfaces 159a, 160a are inclined by about 45° with respect to the rotation axis X, but they can also be inclined by different angles, comprised between 15° and 75°. The choice of the angle determines the adjustment sensitivity.

The thrusting pin 159 is actuated by a dowel 161 screwed into the first hole 23f. The dowel 161 is equipped with a shaped recess 161a configured to couple with a tool (not shown) to be used for the initial adjustment of the gearshift 10. In the example of FIG. 4, the shaped recess 161a is hexagonal star shaped and is configured to couple with a corresponding tool like for example an Allen key.

Each hole 23h, and each thrust plate 160, is arranged in a radially inner position with respect to a respective thrusting member 56, which also in this case comprises a plurality of cup springs 57.

Since the washers are not provided, each substantially cylindrical seat 53a of the jaws 54 is configured to house at least part of the cup springs 57.

Figure 6:
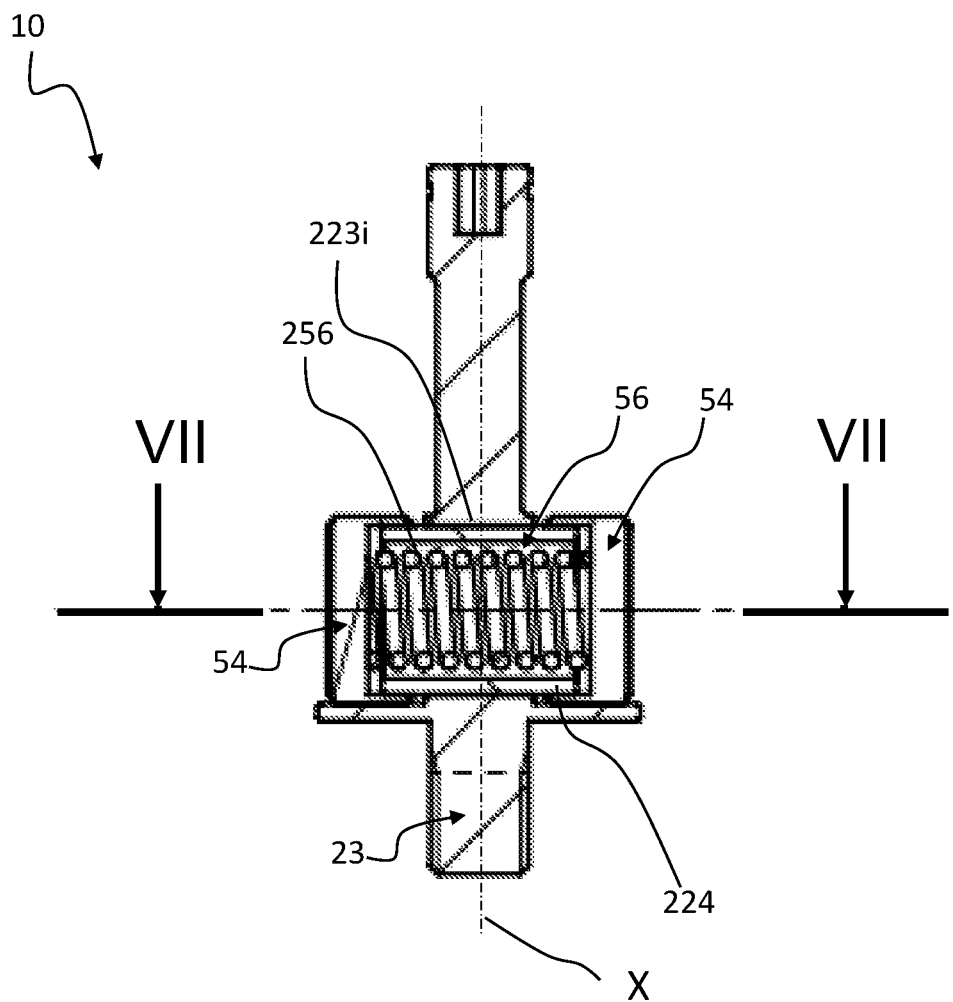
FIG. 6 is a longitudinal section view of some components of a portion of a third preferred embodiment of a bicycle gearshift in accordance with the present invention.
Figure 7:
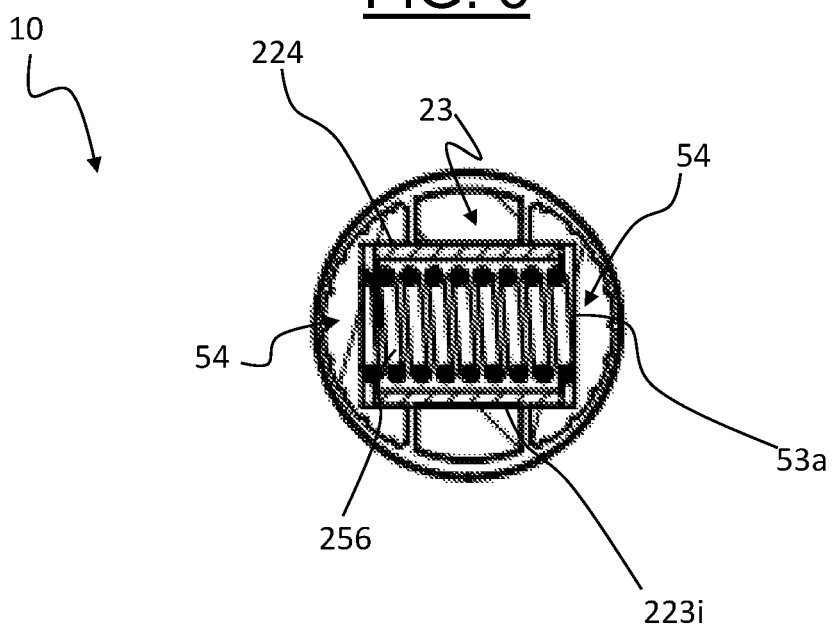
FIG. 7 is a cross section view of the components of FIG. 6, taken according to the plane VII-VII of FIG. 6.

FIGS. 6 and 7 show a portion of a third preferred embodiment of a bicycle gearshift 10 according to the present invention. What is not shown is identical to what is shown in FIGS. 1-3.

The components of the bicycle gearshift 10 of FIGS. 6 and 7 analogous or functionally equivalent to those of the bicycle gearshift 10 of FIGS. 1-3 are indicated with the same reference numeral and for their description reference should be made to what has been described above.

The bicycle gearshift 10 of FIGS. 6 and 7 differs from the bicycle gearshift 10 of FIGS. 1-3 substantially in that the thrusting member 56 comprises an elastic element 256 that is housed in a through hole 223i formed in the shaft 23 along a direction perpendicular to the rotation axis X. In particular, the through hole 223i is made at the enlarged portion 23d of the shaft 23 and opens out onto the two opposite flat surfaces 23e.

In the non-limiting example shown in FIGS. 6 and 7, the elastic element 256 is a helical spring.

A bushing 224 is arranged between the through hole 223i and the elastic element 256. The bushing 224 contributes to prevent undesired axial movements of the helical spring.

The elastic element 256 is arranged in a radially inner position with respect to the two opposite jaws 54.

The elastic element 256 thus passes through the shaft 23 and pushes, at the two end portions thereof, the two jaws 54, thus pressing the two opposite friction surfaces 52 against the radially inner surface 86a of the annular element 86 with the same force.

Each jaw 54 is provided with a respective substantially cylindrical seat 53a that is configured to house a respective end portion of the elastic element 256.

Figure 8:
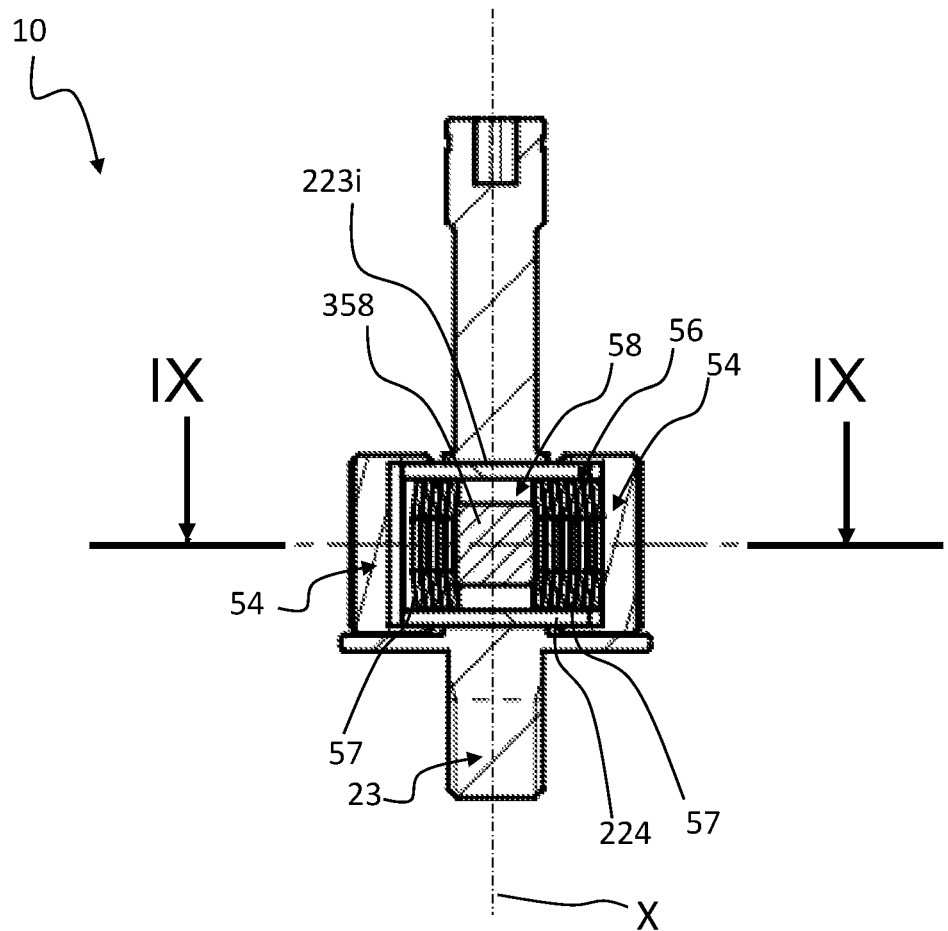
FIG. 8 is a longitudinal section view of some components of a portion of a fourth preferred embodiment of a bicycle gearshift in accordance with the present invention.
Figure 9:
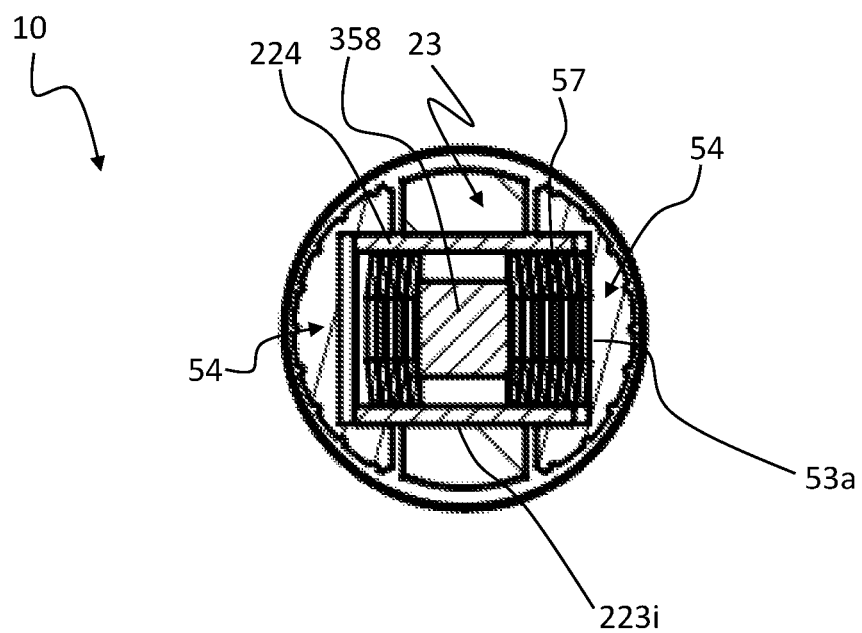
FIG. 9 is a cross section view of the components of FIG. 8, taken according to the plane IX-IX of FIG. 8.

FIGS. 8 and 9 show a portion of a fourth preferred embodiment of a bicycle gearshift 10 according to the present invention. What is not shown is identical to what is shown in FIGS. 1-3.

The components of the bicycle gearshift 10 of FIGS. 8 and 9 analogous or functionally equivalent to those of the bicycle gearshift 10 of FIGS. 1-3 are indicated with the same reference numeral and for their description reference should be made to what has been described above.

The bicycle gearshift 10 of FIGS. 8 and 9 differs from the bicycle gearshift 10 of FIGS. 1-3 substantially in that the adjustment device 58 comprises a spacer element 358 having a predetermined thickness and housed in a through hole 223i formed in the shaft 23 along a direction perpendicular to the rotation axis X. In particular, the through hole 223i is made at the enlarged portion 23d of the shaft 23 and opens out onto the two opposite flat surfaces 23e.

Moreover, in the non-limiting example shown in FIGS. 8 and 9, the thrusting member 56 comprises a plurality of cup springs 57 arranged on opposite sides with respect to the spacer element 358. The cup springs 57 are at least partially housed in the through hole 223i.

A bushing 224 is arranged between the through hole 223i and the spacer element 358. The cup springs 57 are, at least partially, housed inside the bushing 224. The bushing 224 contributes to prevent undesired axial movements of the cup springs 57.

The spacer element 358 and the cup springs 57 are arranged in a radially inner position with respect to the two opposite jaws 54.

The set of cup springs 57 pushes the two opposite jaws 54, so that the two opposite friction surfaces 52 press against the unidirectional rotation device 80 with the same force.

Each jaw 54 is provided with a respective substantially cylindrical seat 53a that is configured to house part of the cup springs 57.

The substantially cylindrical seats 53a contribute to prevent undesired axial movements of the cup springs 57.

Figure 10:
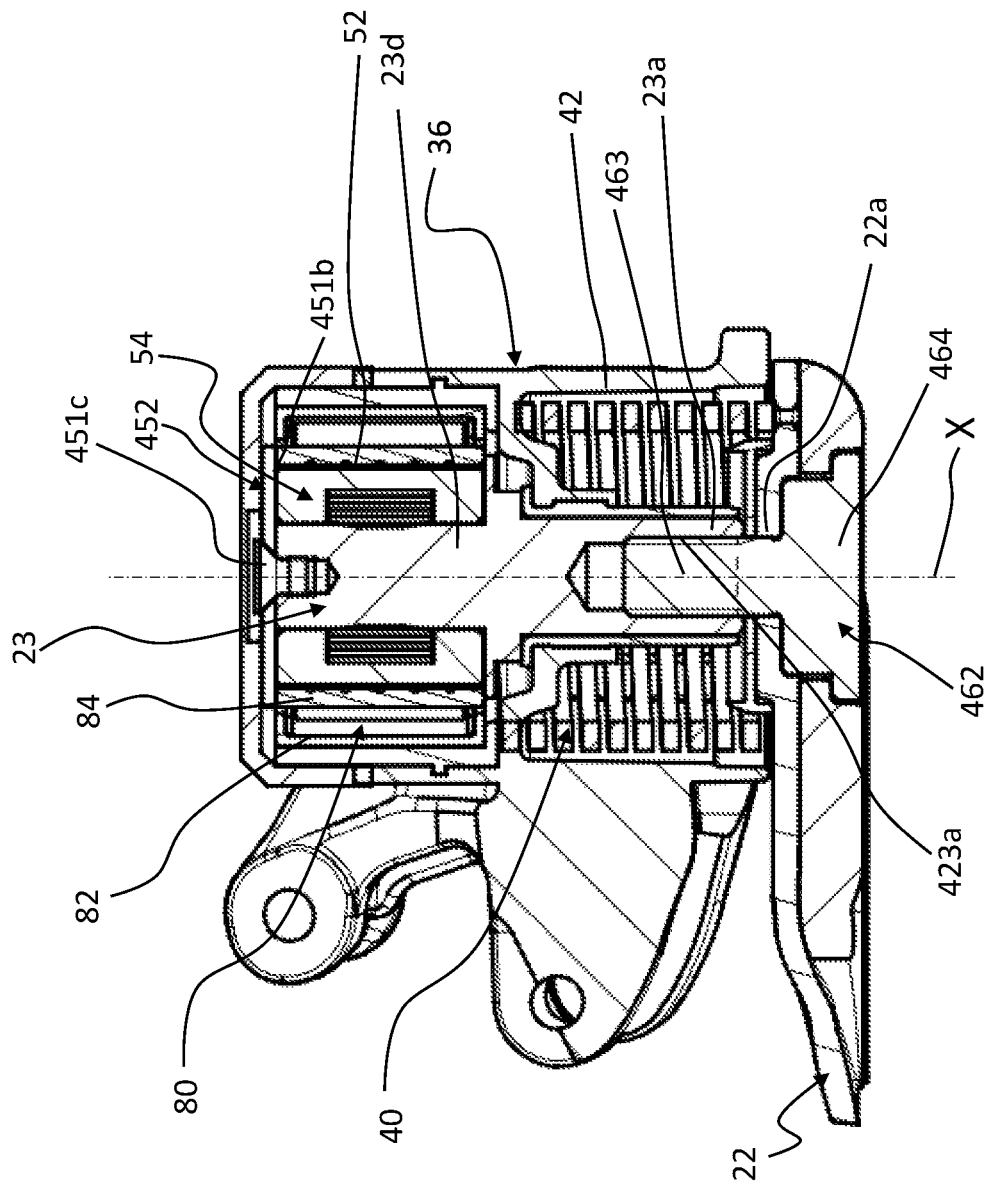
FIG. 10 is a longitudinal section view of a portion of a fifth preferred embodiment of a bicycle gearshift in accordance with the present invention.
Figure 11:
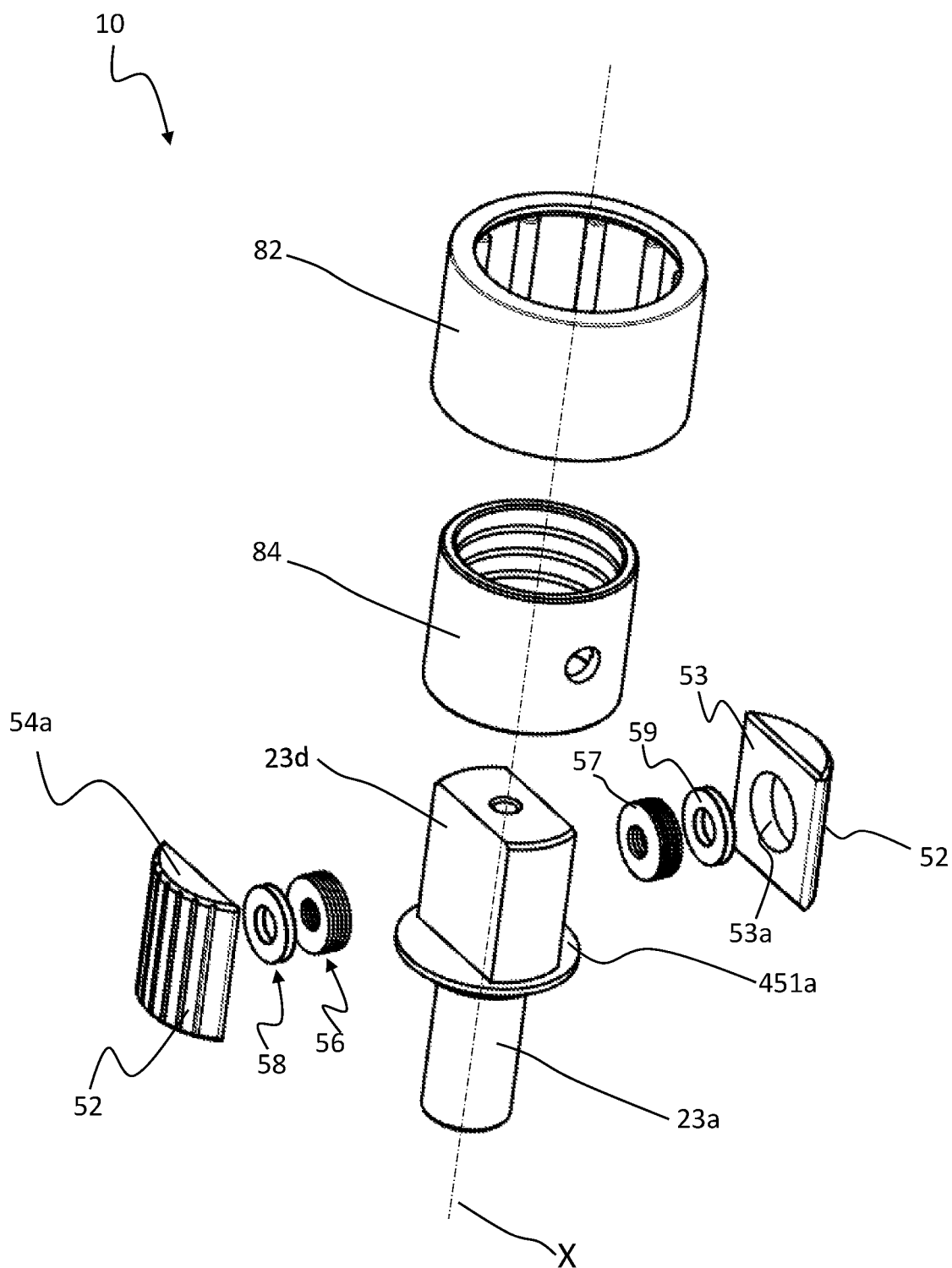
FIG. 11 is an exploded perspective view of some components of the portion of the bicycle gearshift of FIG. 10.

FIG. 10 shows a fifth preferred embodiment of a bicycle gearshift 10 according to the present invention. FIG. 11 shows a portion of such an embodiment.

The components of the bicycle gearshift 10 of FIGS. 10 and 11 analogous or functionally equivalent to those of the bicycle gearshift 10 of FIGS. 1-3 are indicated with the same reference numeral and for their description reference should be made to what has been described above.

The bicycle gearshift 10 of FIGS. 10 and 11 differs from the bicycle gearshift 10 of FIGS. 1-3 substantially in that the damping device 50 is arranged in a radially inner position with respect to the inner ring 84 of the radial bearing of the unidirectional rotation device 80. In this case, therefore, the annular element 86 is not provided.

The friction surface 52 of the jaws 54 therefore exerts a thrust directly on the inner ring 84 of the radial bearing.

Also in this case the radial bearing is preferably a roller bearing.

As shown in FIG. 10, a fixing element 462, provided with a threaded shank 463 and with a head 464, is fixed to the outer plate 22 of the rocker arm 20.

The shank 463 extends coaxially to the rotation axis X and passes through a through hole 22a of the outer plate 22.

The head 464 is configured to be housed with axial abutment in a housing seat suitably provided in the outer plate 22.

The fixing element 462 can be co-molded, glued, embedded with interference or joined in other per se conventional ways to the outer plate 22.

An end portion 23a of the shaft 23 has a threaded blind hole 423a in which the threaded shank 463 of the fixing element 462 is screwed.

The shaft 23 can thus rotate as a unit with the rocker arm 20 about the rotation axis X with respect to the second body 36.

The shaft 23 comprises an end portion 23a and an enlarged portion 23d. In this case, the cylindrical portion 23c shown in the previous figures is not provided.

The damping device 50 is arranged at the enlarged portion 23d and is arranged between the enlarged portion 23d itself and the inner ring 84 of the radial bearing.

Like in the gearshift 10 of FIGS. 1-3, the damping device 50 of the gearshift of FIGS. 10 and 11 comprises two friction surfaces 52 that extend axially along a direction substantially parallel to the rotation axis X and circumferentially about the rotation axis X for an arc of circumference having a center on the rotation axis X and a center angle lower than 180°, preferably comprised between 80° and 160°, more preferably between 110° and 140°, even more preferably equal to about 125°.

The two friction surfaces 52 are arranged on opposite sides with respect to the rotation axis X, i.e. about 180° from one another.

Each friction surface 52 is defined on a respective jaw 54, identical to the one described earlier.

The helical return spring 40 is axially adjacent to the inner ring 84. In particular, the helical return spring 40 is axially arranged between the inner ring 84 of the radial bearing and the rocker arm 20. The damping device 50 is therefore in an axially adjacent position with respect to the helical return spring 40.

Like in the gearshift 10 of FIGS. 1-3, the enlarged portion 23d comprises two opposite flat surfaces 23e, each facing a respective jaw 54.

The gearshift 10 of FIGS. 10 and 11 comprises a pair of axial abutment surfaces 451a, 451b arranged on opposite sides with respect to the damping device 50 and configured to prevent an axial movement of the jaws 54.

The axial abutment surface 451a is made in a single piece with the shaft 23. In particular, it is arranged between the enlarged portion 23d and the end portion 23a. In the non-limiting example shown in FIGS. 10 and 11, the axial abutment surface 451a is formed substantially at the middle of the shaft 23.

The axial abutment surface 451b, on the other hand, is defined by a flange 452 associated with a face of the enlarged portion 23d of the shaft 23 opposite the one facing towards the end portion 23a. In the non-limiting example shown in FIG. 10, the flange 452 is fixed to the shaft 23 through a screw 451c.

The jaws 54 have two opposite axial abutment surfaces 54a which are axially contained between the axial abutment surfaces 451a, 451b with a suitable clearance that prevents the sliding thereof.

Figure 12:
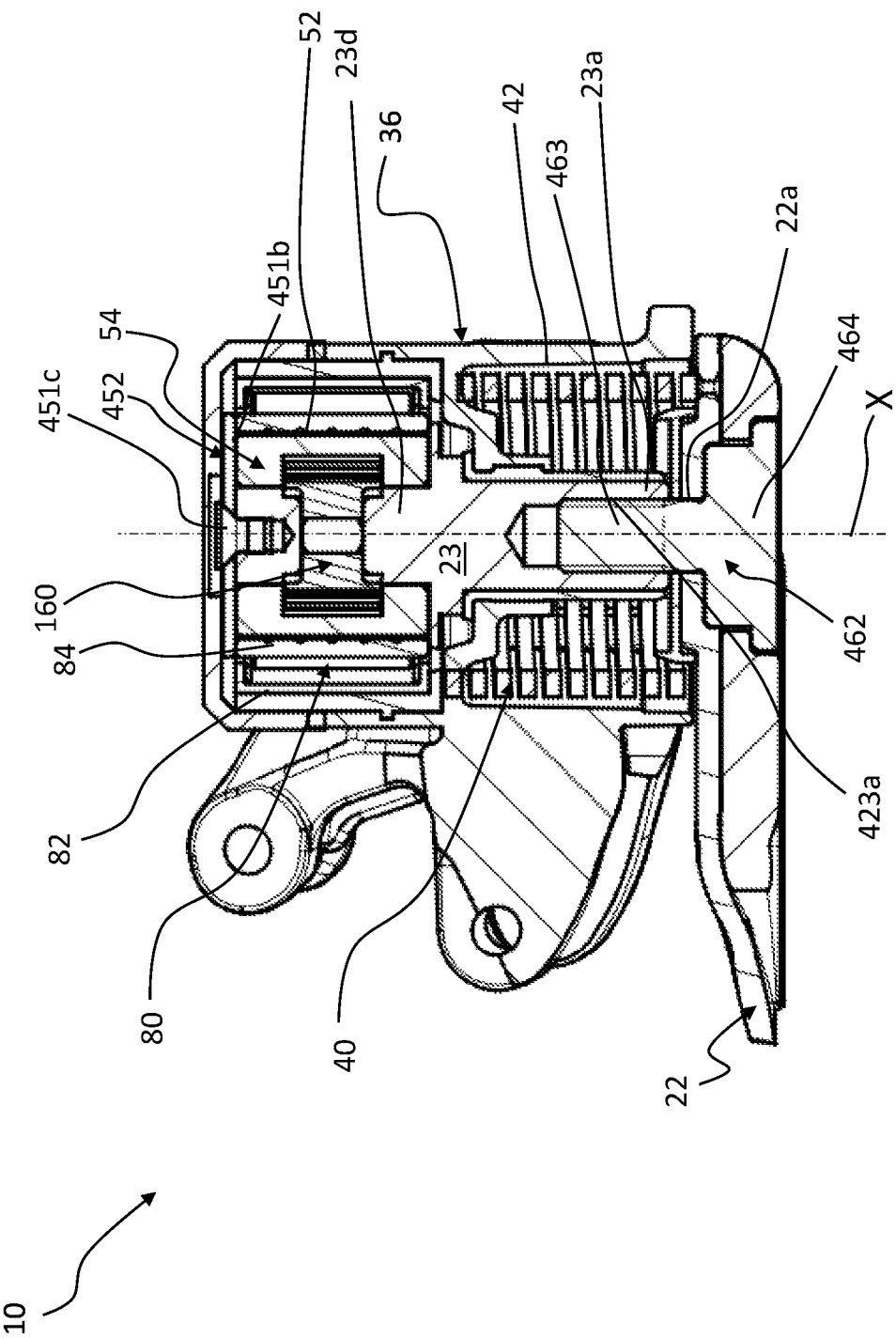
FIG. 12 is a longitudinal section view of a portion of a sixth preferred embodiment of a bicycle gearshift in accordance with the present invention.
Figure 13:
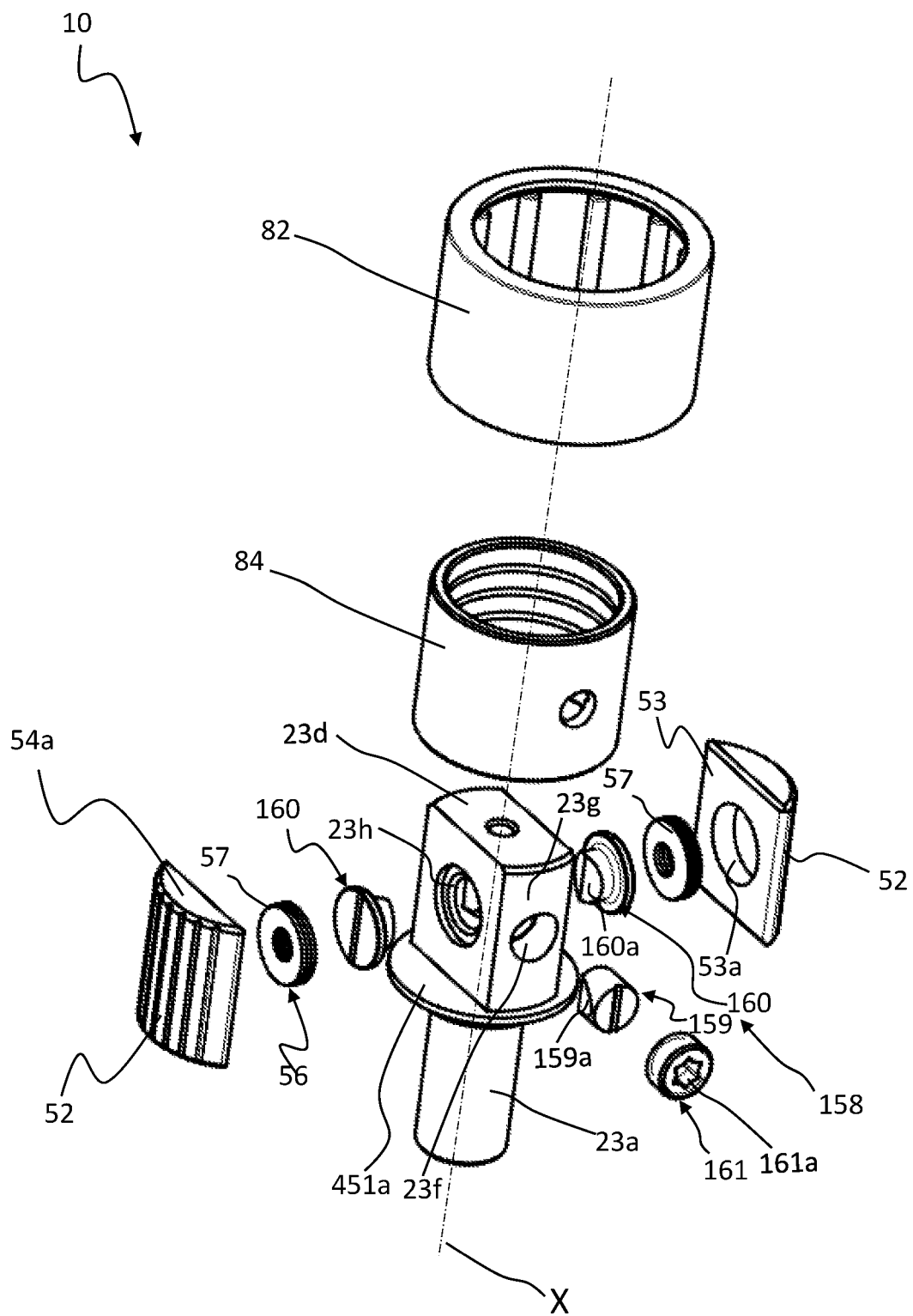
FIG. 13 is an exploded perspective view of some components of the portion of the bicycle gearshift of FIG. 12.

FIG. 12 shows a sixth preferred embodiment of a bicycle gearshift 10 according to the present invention. FIG. 13 shows a portion of such an embodiment.

The components of the bicycle gearshift 10 of FIGS. 12 and 13 analogous or functionally equivalent to those of the bicycle gearshift 10 of FIGS. 10 and 11 are indicated with the same reference numeral and for their description reference should be made to what has been described above.

The bicycle gearshift 10 of FIGS. 12 and 13 differs from the bicycle gearshift 10 of FIGS. 10 and 11 substantially in that the adjustment device 58 comprises a preload device 158 comprising a thrusting pin 159 and a pair of opposite thrusting plates 160.

The preload device 158 is totally analogous to the one described above with reference to the second embodiment of the gearshift 10 shown in FIGS. 4 and 5.

Of course, in order to satisfy specific and contingent requirements, those skilled in the art can bring numerous modifications and variants to the various embodiments of the bicycle gearshift described above, all of which are in any case within the scope of protection of the present invention as defined by the following claims.

In particular, the damping device 50 shown in FIGS. 10 and 11 could be replaced by the damping device 50 shown in FIGS. 6 and 7 or by the damping device 50 shown in FIGS. 8 and 9. In general, those skilled in the art can combine the features of the different embodiments of the invention herein described and shown as desired.

Although the radial bearing shown in FIGS. 10-13 is axially adjacent to the helical return spring 40, there are embodiments in which the radial bearing is radially inner with respect to the helical return spring 40, providing a damping device 50 having a low radial bulk or a helical return spring 40 having an increased diameter, thereby obtaining a greater axial compactness of the gearshift 10.

What is claimed is:

1. A bicycle gearshift, comprising:
    a first body configured to be associated with a bicycle frame;
    a second body connected to, and moveable with respect to, said first body;
    a rocker arm rotatably connected to said second body at a rotation axis;
    a shaft extending coaxially to said rotation axis and fixedly associated with said rocker arm;
    a unidirectional rotation device operatively arranged between said shaft and said second body and configured to allow the rotation of said shaft with respect to the second body only in a first direction of rotation about said rotation axis;
    a first elastic element associated with the second body and with the rocker arm and configured to push said rocker arm into rotation about said rotation axis in said first direction of rotation;
    a damping device operatively arranged between said shaft and said unidirectional rotation device and configured to generate a friction force when said rocker arm is moved about said rotation axis in a second direction of rotation opposite to said first direction of rotation; and
    said damping device comprises at least one friction surface extending axially along a direction parallel to the rotation axis and in contact with said unidirectional rotation device.

2. The gearshift according to claim 1, wherein said damping device comprises at least two of said friction surfaces.

3. The gearshift according to claim 2, wherein each of said at least two friction surfaces extends circumferentially about said rotation axis for an arc of circumference having a center on said rotation axis and a center angle lower than 180°.

4. The gearshift according to claim 1, wherein said damping device comprises at least one thrusting member configured to thrust said at least one friction surface against said unidirectional rotation device with a predetermined load.

5. The gearshift according to claim 4, wherein said damping device comprises at least two of said friction surfaces and said at least one thrusting member comprises a second elastic element which is housed in a through hole formed in said shaft along a direction perpendicular to said rotation axis and which is arranged in a radially inner position with respect to said at least two friction surfaces.

6. The gearshift according to claim 4, wherein said at least one thrusting member comprises at least one cup spring or at least one helical spring arranged between said shaft and said at least one friction surface.

7. The gearshift according to claim 4, wherein said damping device comprises an adjustment device configured to adjust said predetermined load.

8. The gearshift according to claim 7, wherein said adjustment device comprises at least one first spacer element having a predetermined thickness arranged between said at least one thrusting member and at least one among said at least one friction surface and said shaft.

9. The gearshift according to claim 7, wherein said adjustment device comprises a preload device comprising a thrusting pin moveable in a first hole extending in said shaft along a first direction perpendicular to the rotation axis and exerting a thrust on at least one thrust plate moveable in a second hole connected to said first hole and extending in said shaft along a second direction perpendicular to the rotation axis, wherein said second hole is arranged in a radially inner position with respect to said at least one thrusting member.

10. The gearshift according to claim 7, wherein said damping device comprises at least two of said friction surfaces, said adjustment device comprises a second spacer element having a predetermined thickness, the second spacer element being housed in a through hole formed in said shaft along a direction perpendicular to said rotation axis and arranged in a radially inner position with respect to said at least two friction surfaces, and said at least one thrusting member comprises a plurality of cup springs housed inside a bushing housed in said through hole and arranged on opposite sides with respect to said second spacer element.

11. The gearshift according to claim 1, wherein said shaft comprises, in a radially inner position with respect to said damping device, an enlarged portion comprising at least one planar surface.

12. The gearshift according to claim 7, wherein said shaft comprises, in a radially inner position with respect to said damping device, an enlarged portion comprising at least one planar surface, and said adjustment device is arranged at said enlarged portion.

13. The gearshift according to claim 1, wherein said unidirectional rotation device comprises a radial bearing having an outer ring fixedly associated with said second body and an inner ring operatively associated with said at least one friction surface, and said damping device is at least partially arranged in a radially inner position with respect to said inner ring or in a radially inner position with respect to an annular element fixedly associated with, and axially adjacent to, said inner ring.

14. The gearshift according to claim 1, further comprising a pair of axial abutment surfaces arranged on opposite sides with respect to said damping device and configured to prevent an axial movement of said damping device.

15. The gearshift according to claim 1, wherein said first elastic element comprises a helical return spring and said damping device is arranged at least partially in a radially inner position with respect to said return spring or in an axially adjacent position with respect to said return spring.

* * * * *